(12) United States Patent
Choi

(10) Patent No.: US 9,458,749 B2
(45) Date of Patent: Oct. 4, 2016

(54) CATALYST UNIT

(71) Applicant: Hyundai Motor Company, Seoul (KR)

(72) Inventor: Sungmu Choi, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 117 days.

(21) Appl. No.: 14/459,479

(22) Filed: Aug. 14, 2014

(65) Prior Publication Data

US 2014/0356239 A1 Dec. 4, 2014

Related U.S. Application Data

(62) Division of application No. 13/296,028, filed on Nov. 14, 2011, now abandoned.

(30) Foreign Application Priority Data

May 13, 2011 (KR) .................. 10-2011-0045177

(51) Int. Cl.
| | | |
|---|---|---|
| *C23D 5/00* | (2006.01) | |
| *F01N 3/28* | (2006.01) | |
| *F01N 3/022* | (2006.01) | |
| *B01J 35/04* | (2006.01) | |
| *B01J 37/02* | (2006.01) | |
| *B01D 53/94* | (2006.01) | |

(52) U.S. Cl.
CPC .............. *F01N 3/2839* (2013.01); *B01J 35/04* (2013.01); *B01J 37/0234* (2013.01); *F01N 3/0222* (2013.01); *F01N 3/2828* (2013.01); *F01N 3/2892* (2013.01); *B01D 53/944* (2013.01); *B01D 53/945* (2013.01); *B01D 2255/9155* (2013.01); *F01N 2510/068* (2013.01); *Y02T 10/20* (2013.01); *Y02T 10/22* (2013.01); *Y10T 428/24157* (2015.01)

(58) Field of Classification Search
CPC . F01N 3/0222; F01N 2/2839; B01D 53/944; B01D 2255/9155; Y10T 428/24157; Y02T 10/20
USPC .............. 422/177, 180; 427/294, 350, 420.1, 427/376.4, 376.6, 435, 238, 285
See application file for complete search history.

(56) References Cited

U.S. PATENT DOCUMENTS 5,514,446 A 5/1996 Machida et al.
5,866,210 A * 2/1999 Rosynsky ................ B01J 35/04
118/50

FOREIGN PATENT DOCUMENTS

| | | |
|---|---|---|
| CN | 1346694 A | 5/2002 |
| JP | 61-97037 A | 5/1986 |
| JP | 10-280950 A | 10/1998 |
| JP | 2001-241322 A | 9/2001 |
| JP | 2004-255299 A | 9/2004 |
| JP | 2010-46577 A | 3/2010 |
| KR | 10-0610449 B1 | 8/2006 |

* cited by examiner

*Primary Examiner* — Tom P Duong
(74) *Attorney, Agent, or Firm* — Morgan, Lewis & Bockius LLP

(57) ABSTRACT

A catalyst unit may include a carrier that channels may be formed from a front surface thereof to a rear surface thereof, and plugs that closes the channels that may be formed along an edge portion of the front surface except a central portion of the front surface, wherein a coating layer may be not formed in the channels that the plugs may be disposed and a coating layer may be formed along the remaining opened channels.

1 Claim, 4 Drawing Sheets

CATALYST UNIT

CROSS-REFERENCE TO RELATED APPLICATION

The present application is a Divisional of U.S. patent application Ser. No. 13/296,028, filed Nov. 14, 2011, which claims priority to Korean Patent Application No. 10-2011-0045177 filed in the Korean Intellectual Property Office on May 13, 2011, the entire contents of which applications are incorporated herein for all purposes by this reference.

BACKGROUND OF THE INVENTION

1. Field of the Invention

The present invention relates to a catalyst unit that includes catalyst ingredients to reduce harmful materials of exhaust gas according to a flow characteristic.

2. Description of Related Art

In a vehicle, a three way catalyst converter is generally used to purify exhaust gas, which is disposed on an exhaust pipe, and the specifications thereof are different, because exhaust gas flow rates are different according to vehicles.

The three way catalytic converter simultaneously reacts harmful materials of exhaust gas such as carbon monoxide, nitrogen oxide, and hydrocarbon compound to eliminate these materials, and mainly Pt/Rh, Pd/Rh or Pt/Pd/Rh series is formed in the three way catalytic converter.

Meanwhile, a diesel vehicle that generates large amount of noxious exhaust gas is excellent in a fuel consumption efficiency and a power output, but nitrogen oxide and PM (particulate matters) are heavily included therein in contrast to a gasoline vehicle.

In the diesel vehicle like this, because intake air is sufficiently combusted in the most of driving condition, carbon monoxide and hydrocarbon is very little compared to the gasoline vehicle and nitrogen oxide and PM is heavily exhausted.

Recently, as a post process art, a diesel particulate filter research is very actively being undergone so as to correspond to the reinforced exhaust gas standard of the diesel vehicle, and there are many parts that are to be developed so as to apply the diesel particulate filter to a real vehicle.

Platinum is used in a coating layer of a Diesel Oxidation Catalyst (DOC), separately, Diesel Particulate Filter (DPF) is applied to a system of DOC+DPF, and CPF, which is recently being mass produced in a EU vehicle maker, and the reliability thereof increased the sales of the system.

And, a diesel particulate filter that a catalyst is coated thereon, which is called a diesel catalyzed particulate filter, has been developed. Meanwhile, several methods have been widely known for coating different kinds of catalyst on a cordierite carrier, and there are many prior arts.

For example, there is a dipping method that a cordierite carrier is dipped into catalyst solutions respectively having different concentrations and there is a suction method that one end side of a carrier is dipped into a catalyst solution and a vacuum pressure is formed in the other end side of the carrier to suck the catalyst solution through channels of the carrier.

However, these methods can be applied to a wall flow type of a carrier, and more particularly, different kinds coatings can be only applied to a carrier having the wall flow type, wherein CO or HC flows into an inlet of a channel of the carrier to get out of the outlet thereof.

Meanwhile, a noble metal is coated in the whole carrier regardless of flow characteristic of exhaust gas when manufacturing the catalyst carrier, wherein there is a problem that a noble metal is not efficiently used according to the flow characteristic of the exhaust gas.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a catalyst unit having advantages of decreasing a manufacturing cost by saving a noble metal.

In an aspect of the present invention, the catalyst unit may include a carrier that channels are formed from a front surface thereof to a rear surface thereof, and plugs that closes the channels that are formed along an edge portion of the front surface except a central portion of the front surface, wherein a coating layer is not formed in the channels that the plugs are disposed and a coating layer is formed along the remaining opened channels.

The opened channels that the plugs are not formed thereon may have an inlet and an outlet that are opened, and exhaust gas flows into the inlet and flows out of the outlet.

An outlet of the channels that inlets thereof are closed by the plugs is closed by plugs.

In another aspect of the present invention, a manufacturing method of a catalyst unit, may include extruding a carrier that channels are formed therein from a front surface to a rear surface, plugging channels that are formed along an edge portion of the front surface by plugs, and coating catalyst along opened channels that are not plugged by the plugs.

The front surface of the carrier is dipped into a catalyst solution, which is wash coat, and the catalyst solution is sucked from the rear surface of the carrier through the opened channels such that the catalyst solution coats along an interior surface of the opened channels in the process for coating the catalyst solution.

In further another aspect of the present invention, an exhaust gas purification device may include an exhaust line that exhaust gas passes therethrough, a converter housing being disposed on the exhaust line and having a converter cone portion formed near the exhaust line, a catalyst unit that is disposed within the converter housing and reduces harmful material of the exhaust gas, wherein an inlet of channels in the catalyst unit that is formed near the converter cone portion is closed by plugs to form closed channels, coating layer is not formed along the closed channels, and coating layer is formed along an interior surface of remained opened channels.

A diameter of the converter cone portion may be larger than that of the exhaust line.

As stated above, in the catalyst unit according to the present invention, the channels that are formed correspondingly to dead zone that exhaust gas flow is low are closed by plugs and the catalyst coating layer is not formed along the interior surface of the closed channels. Accordingly, the cost of the catalyst can be saved, and the purification rate of the exhaust gas is securely maintained by closing the channels that the exhaust gas flow is less.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
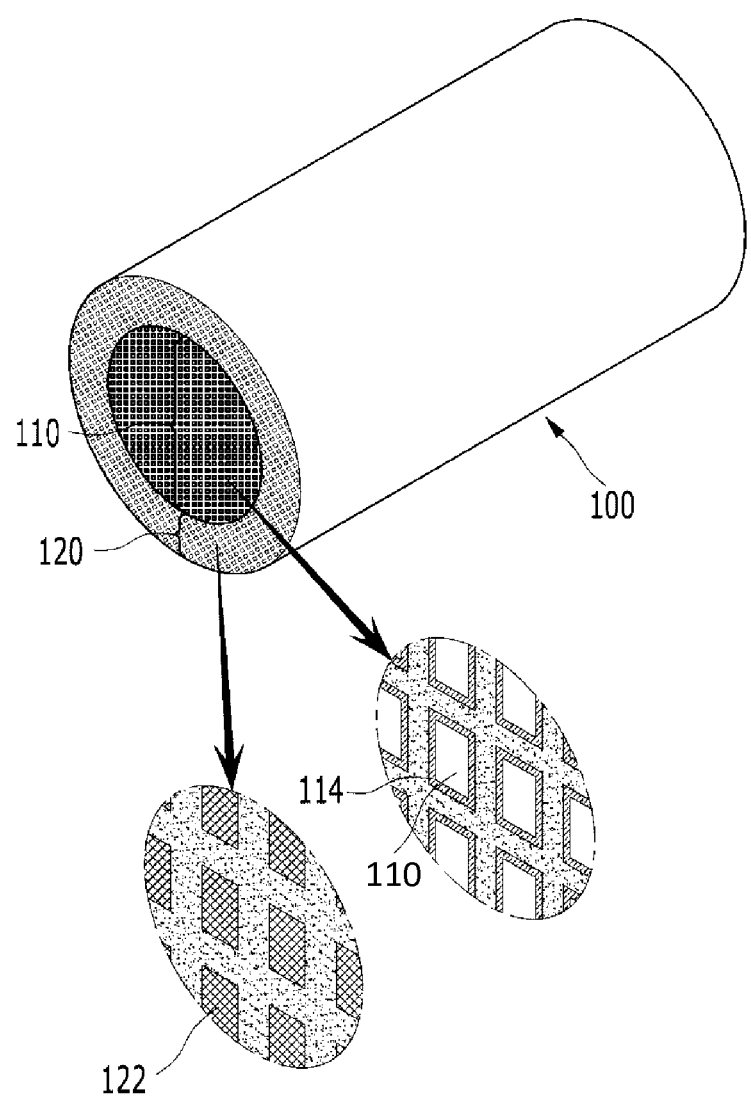
FIG. 1 is a schematic perspective view of a catalyst unit according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic perspective view of a catalyst unit according to an exemplary embodiment of the present invention.

Referring to FIG. 1, channels are formed from the front surface to the rear surface of the catalyst unit 100, wherein the channels includes opened channels 110 and closed channels 120. In an exemplary embodiment of the present invention, the catalyst unit 100 can be called 'carrier'.

More particularly, the channels that are formed on an edge portion along a circumference of the catalyst unit 100 are closed by plugs to form the closed channels 120, and the opened channels 110 are formed in a central portion.

The inlets and the outlets of the closed channels 120 are closed by the plugs 122 and the catalyst coating layers are not formed along the interior surface of the closed channels. However, the catalyst coating layer 114 is formed along the interior surface of the opened channels 110, as shown.

The exhaust gas flows through the opened channels that are formed in a central portion of the catalyst unit 100, and the exhaust gas hardly flows an edge portion of the catalyst unit 100. Accordingly, the edge portion that the exhaust gas hardly flows is closed by the plugs 122 and the catalyst layer is not formed therein such that the waste of the unnecessary catalyst is reduced.

The opened channel 110 has a flow through type that the inlet and the outlet are opened, and the catalyst unit 100 can be made up of cordierite material.

Figure 2:
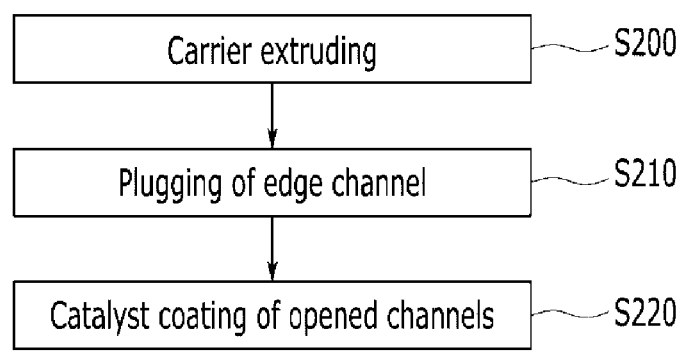
FIG. 2 is a flowchart showing a manufacturing method of a catalyst unit according to an exemplary embodiment of the present invention.

FIG. 2 is a flowchart showing a manufacturing method of a catalyst unit according to an exemplary embodiment of the present invention.

Referring to FIG. 2, in a S200, the catalyst unit 100 (hereinafter, carrier) is extruded. In this case, the opened channels are simultaneously formed from the front surface to the rear surface of the carrier 100.

After the carrier is extruded to be made, in a S210, the inlet of the edge channel is plugged by the plug 122.

If the plugging is completed, in a S220, the opened channels 110 that are not plugged by the plug 122 is coated by the catalyst coating layer 114.

Figure 3:
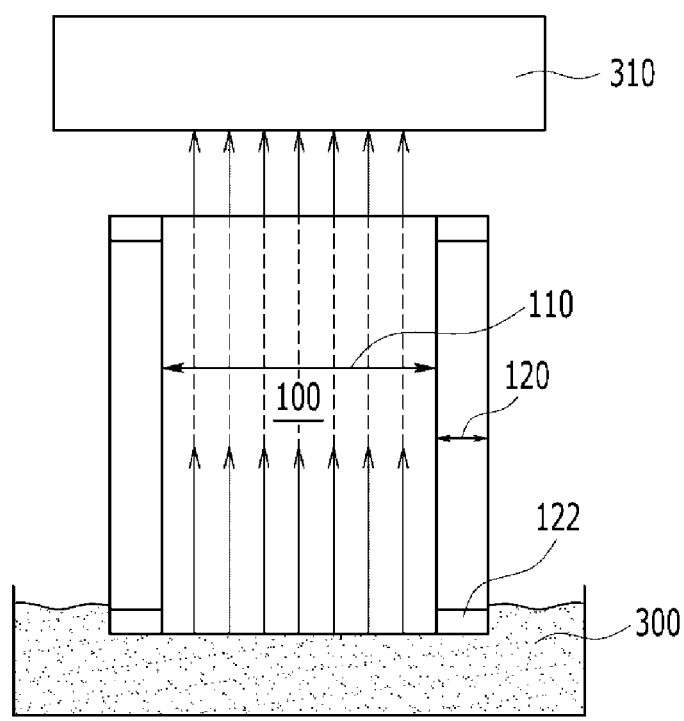
FIG. 3 is a schematic cross sectional side view showing a method for coating catalyst in a catalyst unit according to an exemplary embodiment of the present invention.

FIG. 3 is a schematic cross sectional side view showing a method for coating catalyst in a catalyst unit according to an exemplary embodiment of the present invention.

Referring to FIG. 3, in a condition that the edge channels of the front side or the rear side of the catalyst unit 100 is closed by the plug 122, the front side of the catalyst unit 100 is dipped into catalyst solution 300, which is wash coat.

And, the suction device 310 that is disposed on the rear side of the catalyst unit 100 is used to suck the catalyst solution 300 through the opened channels 110, and the catalyst coating layer 114 is formed along the interior surface of the opened channels 110.

Accordingly, the catalyst coating layer is not formed along the interior surface of the closed channels 120 that are formed in an edge portion such that the catalyst usage amount is reduced to save the production cost. Further, since the exhaust gas hardly flow the edge portion except the central portion of the front surface of the catalyst unit 100, the purification rate hardly decreases.

Figure 4:
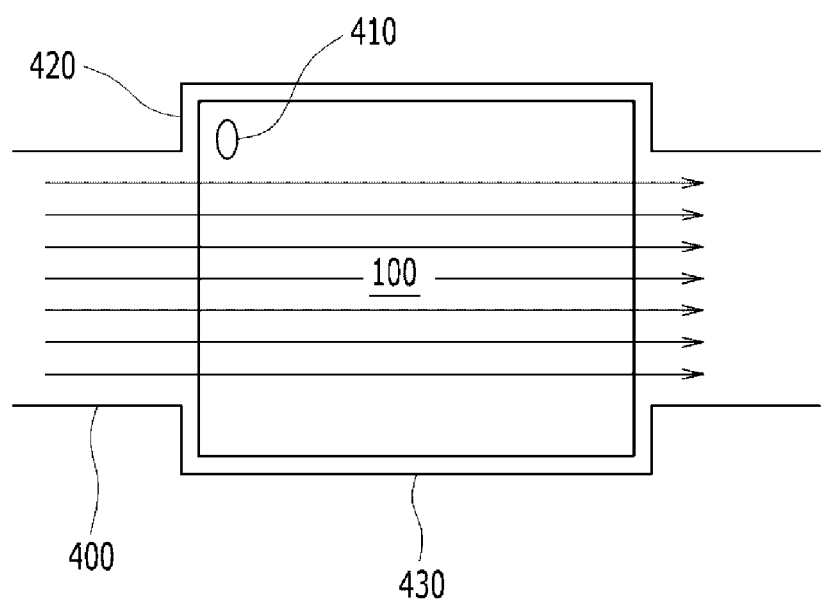
FIG. 4 is a cross sectional side view showing a condition that a catalyst unit is disposed according to an exemplary embodiment of the present invention.

FIG. 4 is a cross sectional side view showing a condition that a catalyst unit is disposed according to an exemplary embodiment of the present invention.

Referring to FIG. 4, a converter housing 430 is disposed on the exhaust line and the catalyst unit 100, carrier, is disposed within the converter housing 430.

As shown, a converter cone portion 420 that the interior diameter thereof becomes wider is formed on the converter housing 430 near the exhaust line 400, and an edge portion of the catalyst unit 100 is supported by a portion of the converter cone portion 420.

Accordingly, a dead zone 410 is formed in a part of the catalyst unit 100 corresponding to the converter cone portion 420, wherein the exhaust gas hardly flows the dead zone.

In an exemplary embodiment of the present invention, the inlet or the outlet of the channels that are formed around a edge portion of the carrier 100 corresponding to the dead zone 410 are closed by the plug 122 and the coating layer is not formed in the closed channels. Accordingly, the purification rate of the exhaust gas is not be deteriorated and the catalyst elements is efficiently used.

For convenience in explanation and accurate definition in the appended claims, the terms "interior" and "exterior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a catalyst unit, comprising:
extruding a carrier wherein the carrier includes open channels formed in the carrier from a front surface to a rear surface of the carrier;
plugging a subset of the open channels formed along an outer edge portion of the front surface of the carrier by plugs, forming closed channels; and
coating catalyst along remaining open channels not plugged by the plugs,
wherein the front surface of the carrier is dipped into a catalyst solution, which is wash coat, and the catalyst solution is configured to be pulled from the rear surface of the carrier through a front surface of the remaining open channels by a suction force applied to the rear surface of the carrier such that the catalyst solution is coated along an interior surface of the remaining open channels.

* * * * *